United States Patent Office 2,801,951
Patented Aug. 6, 1957

2,801,951
STABILIZED ANALGESIC COMPOSITIONS

Ralph M. Cooper, Jr., Nassau, N. Y., assignor to Sterling Drug Inc., New York, N. Y., a corporation of Delaware No Drawing. Application January 9, 1956,
Serial No. 557,866

6 Claims. (Cl. 167—55)

This invention relates to new stable analgesic compositions containing as the essential ingredients, acetylsalicylic acid, citric acid, p-ethoxyacetanilide and caffeine, and as a stabilizing and buffering component, either basic magnesium carbonate or a combination of magnesium hydroxide and aluminum hydroxide.

Analgesic compositions containing acetylsalicylic acid, p-ethoxyacetanilide and caffeine have long been used in the relief of pain in headache, dysmenorrhea, neuralgia, etc. However, owing to the acidic nature of the mixture, these compositions often cause considerable gastric distress and are deleterious in the case of various pathological conditions of the stomach. Consequently, it is highly desirable that a buffer or antacid material be incorporated in the composition. However, it has not been possible until the present invention to devise such a composition with adequate stability. In all previous instances the acetylsalicylic acid decomposed into acetic acid and salicylic acid in a few weeks or less after preparation to such an extent that the content of free salicylic acid had risen far above acceptable levels.

According to the present invention, buffered acetylsalicylic acid - p - ethoxyacetanilide-caffeine compositions have been discovered which exhibit a remarkable stability over periods of a year or more. The following are the critical features of the new compositions contributing to their stability:

1. Intimate mixing of the components
2. Thorough dryness of materials
3. The amount of citric acid relative to the amount of acetylsalicylic acid
4. The amount and nature of the buffer relative to the amount of acetylsalicylic acid.

The amount of citric acid relative to the amount of acetylsalicylic acid must be between about 10% and 15% for maximum stability. Compositions containing less than 10% of citric acid relative to acetylsalicylic acid exhibit poor stability, and a quantity of citric acid higher than 15% relative to acetylsalicylic acid content imparts impaired stability and requires a larger amount of buffer to neutralize it upon ingestion.

In the compositions containing basic magnesium carbonate as the buffer, for maximum stability the amount of basic magnesium carbonate relative to the amount of acetylsalicylic acid should be between about 20% and 70%. The basic magnesium carbonate used in the manufacture of the composition is one of the commercially available basic magnesium carbonates, i. e., the "light" or "heavy" magnesium carbonates of pharmacy. The light and heavy magnesium carbonates are prepared as described in many texts on inorganic chemistry and pharmacy, including Mellor's "A Comprehensive Treatise on Inorganic and Theoretical Chemistry" (Longmans, Green & Co.), volume IV, pp. 364–5; and Remington's "Practice of Pharmacy" (Mack Publishing Co., 1948), ninth edition, pp. 410–11. The exact chemical composition of these basic magnesium carbonates has not been fully established and the analytical results of different investigators are not in agreement. Later references indicate an approximate composition of $(MgCO_3)_4 \cdot Mg(OH)_2 \cdot 5H_2O$.

A preferred embodiment of the invention comprises an analgesic composition consisting of a dry, intimate mixture of between 300 and 400 parts by weight of acetylsalicylic acid, between 40 and 45 parts by weight of citric acid, between 200 and 300 parts by weight of p-ethoxyacetanilide, between 30 and 50 parts by weight of caffeine, between 50 and 200 parts by weight of basic magnesium carbonate, and between 150 and 250 parts by weight of excipient.

A particularly preferred aspect of the invention lies in those compositions in which the buffering component comprises a combination of magnesium hydroxide and aluminum hydroxide. These agents impart an especially high acid-neutralizing efficiency to the composition. The amounts of magnesium hydroxide and aluminum hydroxide present in the composition are preferably from about 45 to 55% and 25 to 30%, respectively, of the amount of acetylsalicylic acid. With lesser amounts of magnesium hydroxide and aluminum hydroxide the composition has insufficient buffering strength, whereas with greater amounts of buffering materials the analgesic components become too highly diluted. The composition can be described as a stable, highly-buffered, analgesic composition comprising a dry, intimate mixture of between 300 and 400 parts by weight of acetylsalicylic acid, between 40 and 45 parts by weight of citric acid, between 200 and 300 parts by weight of p-ethoxyacetanilide, between 30 and 50 parts by weight of caffeine, between 180 and 220 parts by weight of magnesium hydroxide, between 90 and 125 parts by weight of aluminum hydroxide, and between 150 and 250 parts by weight of excipient.

Replacement of the basic magnesium carbonate or the magnesium hydroxide and aluminum hydroxide by other basic substances, viz., calcium carbonate, magnesium trisilicate, magnesium oxide or sodium bicarbonate markedly decreases the stability of the composition.

The excipient can be any of the materials commonly used as a binder, sweetening agent or filler in pharmaceutical tablet manufacture, including such substances as starch, talcum, acacia, dextrin or lactose.

The following examples will illustrate the invention more fully.

Example 1 p-Ethoxyacetanilide (9.7 kg.) and 1.53 kg. of anhydrous caffeine were mixed and granulated with 4 kg. of 10% dextrin solution, and the granulation was thoroughly dried at 65° C. for sixteen hours and then passed through a rotary grinder using a coarse mesh under dehumidified conditions (relative humidity 20–22%), giving 11.3 kg. of dry granulation of p-ethoxyacetanilide and caffeine.

About 3.6 kg. of heavy magnesium carbonate (MgO content=41.7%) was granulated with 4 kg. of 10% acacia solution, and the granulation was thoroughly dried at 65° C. for sixteen hours and put through a rotary grinder using a coarse mesh under dehumidified conditions, giving 3.85 kg. of dry, heavy magnesium carbonate granulation.

About 15.5 kg. of dry acetylsalicylic acid and about 1.75 kg. of anhydrous powdered citric acid were intimately mixed, about 4.85 kg. of dry starch was then added, and the mixture was again intimately mixed. The resulting mixture was slugged and made into a coarse granulation.

20.2 kg. of the above granulation of acetylsalicylic acid, citric acid and starch was intimately mixed under dehumidified conditions with 11.3 kg. of p-ethoxyacetanilide caffeine granulation and 3.85 kg. of heavy magnesium carbonate granulation, prepared as described above, 1.2 kg. of dry lactose and 1.2 kg. of talcum, and the mixture was pressed into tablets using a 13/32" regular concave punch. The resulting tablets had the following composition:

| | Grams |
|---|---|
| Acetylsalicylic acid | 0.1944 |
| Citric acid | 0.0216 |
| p-Ethoxyacetanilide | 0.1296 |
| Caffeine | 0.0216 |
| Heavy magnesium carbonate granulation | 0.0533 |
| Starch | 0.0672 |
| Lactose | 0.0167 |
| Talcum | 0.0167 |

The above quantities correspond to a composition containing 37% acetylsalicylic acid, 4% citric acid, 25% p-ethoxyacetanilide, 4% caffeine, 9% basic magnesium carbonate, and the remainder excipient.

When freshly prepared this composition was found to have a free salicylic acid content of 0.125%. After three months at 37° C. the composition had a free salicylic acid content of 0.44%.

*Example 2*

Tablets having the following composition were prepared according to the method described above in Example 1, varying the quantities of components according to the proportion in which they are present below:

| | Grams |
|---|---|
| Acetylsalicylic acid | 0.2600 |
| Citric acid | 0.0324 |
| p-Ethoxyacetanilide | 0.1944 |
| Caffeine | 0.0324 |
| Heavy magnesium carbonate granulation | 0.0800 |
| Starch | 0.1008 |
| Lactose | 0.0250 |
| Talcum | 0.0250 |

This composition was found to have an initial free salicylic acid content of 0.18%. After one year at 37° C. it was found to have a free salicylic acid content of 0.23%.

*Example 3*

Tablets having the following composition were prepared by the method described above in Example 1, except that the p-ethoxyacetanilide and caffeine were granulated with 10% acacia solution instead of 10% dextrin solution:

| | Grams |
|---|---|
| Acetylsalicylic acid | 0.2600 |
| Citric acid | 0.0324 |
| p-Ethoxyacetanilide | 0.1944 |
| Caffeine | 0.0324 |
| Heavy magnesium carbonate granulation | 0.1804 |
| Starch | 0.0754 |
| Lactose | 0.0250 |
| Talcum | 0.0250 |

This composition was found to have an initial free salicylic acid content of 0.08%. After four months at 37° C. it was found to have a free salicylic acid content of 0.17%.

*Example 4*

A mixture of 130 parts of p-ethoxyacetanilide, 22 parts of anhydrous caffeine, 50 parts of dried aluminum hydroxide gel, 100 parts of magnesium hydroxide and 30 parts of talcum was slugged and reduced to a coarse granule. The mixture was then reslugged and reduced to a No. 10 mesh granule.

Anhydrous citric acid (21 parts), previously dried, was thoroughly mixed with 194 parts of acetylsalicylic acid, and 65 parts of dried starch was added and thoroughly mixed in. The mixture was then slugged and reduced to a No. 10 mesh granule.

The two granulations were mixed, 13 parts of starch added, and the whole compressed into tablets. All mixing and compressing was carried out under dehumidified conditions (not more than 22% relative humidity at 75–78° F.). The tablets had the following specifications:

| | |
|---|---|
| Weight | 625±30 mg. |
| Hardness | 8–10 kg. |
| Thickness | 0.223±0.002 in. |
| Disintegration time | 2–3 min. |
| Acid neutralizing equivalent | At least 35 cc. 0.1 N HCl at pH 3.5. |
| Moisture content | Not more than 1.5%. |

The tablets had the following average composition:

| | Grams |
|---|---|
| Acetylsalicylic acid | 0.194 |
| Citric acid | 0.021 |
| p-Ethoxyacetanilide | 0.130 |
| Caffeine | 0.022 |
| Magnesium hydroxide | 0.100 |
| Aluminum hydroxide | 0.050 |
| Starch | 0.078 |
| Talcum | 0.030 |

The tablets when freshly prepared had a free salicylic acid content of 0.295%. After three months at 37° C. they had a free salicylic acid content of 0.32%, after six months 0.37%, and after nine months 0.41%. In another batch of tablets prepared in the same manner, the initial salicylic acid content was 0.04%, after one month at 37° C. it was 0.14%, after three months 0.15%, and after six months 0.16%.

This application is a continuation-in-part of my co-pending application, Serial No. 353,905, filed May 8, 1953, now abandoned.

I claim:

1. A stable analgesic composition comprising a dry, intimate mixture of acetylsalicylic acid, citric acid, p-ethoxyacetanilide, caffeine, basic magnesium carbonate and excipient in which the citric acid and basic magnesium carbonate are present respectively in amounts of from 10 to 15% and from 20 to 70% of the amount of acetylsalicylic acid.

2. A stable analgesic composition comprising a dry, intimate mixture of between 300 and 400 parts by weight of acetylsalicylic acid, between 40 and 45 parts by weight of citric acid, between 200 and 300 parts by weight of p-ethoxyacetanilide, between 30 and 50 parts by weight of caffeine, between 50 and 200 parts by weight of basic magnesium carbonate, and between 150 and 250 parts by weight of excipient.

3. A stable analgesic composition comprising a dry, intimate mixture of 37% acetylsalicylic acid, 4% citric acid, 25% p-ethoxyacetanilide, 4% caffeine, 9% basic magnesium carbonate, and the remainder excipient.

4. A stable, highly-buffered, analgesic composition comprising a dry, intimate mixture of acetylsalicylic acid, citric acid, p-ethoxyacetanilide, caffeine, magnesium hydroxide, aluminum hydroxide and excipient, in which the citric acid, magnesium hydroxide and aluminum hydroxide are present, respectively, in amounts of from 10 to 15%, from 45 to 55%, and from 25 to 30% of the amount of acetylsalicylic acid.

5. A stable, highly-buffered, analgesic composition comprising a dry, intimate mixture of between 300 and 400 parts by weight of acetylsalicylic acid, between 40 and 45 parts by weight of citric acid, between 200 and 300 parts by weight of p-ethoxyacetanilide, between 30 and 50 parts by weight of caffeine, between 180 and 220 parts by weight of magnesium hydroxide, between 90 and 125 parts by weight of aluminum hydroxide, and between 150 and 250 parts by weight of excipient.

6. A stable, highly-buffered, analgesic composition comprising a dry, intimate mixture of 31% acetylsalicylic acid, 3.4% citric acid, 21% p-ethoxyacetanilide, 3.5% caffeine, 16% magnesium hydroxide, 8% aluminum hydroxide, and the remainder excipient.

References Cited in the file of this patent

UNITED STATES PATENTS

| | | |
|---|---|---|
| 1,486,002 | Alsleben | Mar. 4, 1924 |
| 2,211,485 | Zimmermann | Aug. 13, 1940 |

FOREIGN PATENTS

| | | |
|---|---|---|
| 248 | Australia | Jan. 5, 1927 |

OTHER REFERENCES

Extra Pharmacopoeia, vol. 1, 22nd ed. (1941), p. 17.
Routh: Jour. of the Am. Pharm. Assn., Sci. Ed., January 1950, pp. 21 to 24.